United States Patent
Nguyen et al.

(10) Patent No.: US 12,518,385 B1
(45) Date of Patent: Jan. 6, 2026

(54) COMPUTE SYSTEM WITH NAIL AILMENT DIAGNOSTIC MECHANISM AND METHOD OF OPERATION THEREOF

(71) Applicant: BelleTorus Corporation, Cambridge, MA (US)

(72) Inventors: Thi Thu Hang Nguyen, Toulouse (FR); Tien Dung Nguyen, Toulouse (FR); Nga Thi Thuy Nguyen, Toulouse (FR); Jonathan Wolfe, Plymouth Meeting, PA (US); Duc Thang Nguyen, Toulouse (FR); Quang Do Duy, Hanoi (VN); Hoàng Lê, Hanoi (VN)

(73) Assignee: Belle Torus Corporation, Cambridge, MA (US)

( * ) Notice: Subject to any disclaimer, the term of this patent is extended or adjusted under 35 U.S.C. 154(b) by 0 days.

(21) Appl. No.: 19/065,919

(22) Filed: Feb. 27, 2025

(51) Int. Cl.
*G06T 7/00* (2017.01)
*G06T 7/11* (2017.01)
*G16H 30/40* (2018.01)
*G16H 50/30* (2018.01)

(52) U.S. Cl.
CPC ............ *G06T 7/0012* (2013.01); *G06T 7/11* (2017.01); *G16H 30/40* (2018.01); *G16H 50/30* (2018.01); *G06T 2207/30004* (2013.01); *G06T 2207/30168* (2013.01)

(58) Field of Classification Search
CPC ............ G06T 7/0012; G06T 7/11; G06T 2207/30004; G06T 2207/30168; G16H 30/40; G16H 50/30
See application file for complete search history.

(56) References Cited

U.S. PATENT DOCUMENTS

| | | | |
|---|---|---|---|
| 8,753,883 B2 | 6/2014 | Edinger et al. | |
| 10,506,861 B1* | 12/2019 | Ma | A45D 29/18 |
| 12,268,498 B2* | 4/2025 | Mannino | A61B 5/1455 |
| 2009/0267893 A1* | 10/2009 | Kato | G06F 3/03547 |
| | | | 348/143 |
| 2011/0280843 A1 | 11/2011 | Edinger et al. | |

(Continued)

FOREIGN PATENT DOCUMENTS

CN 118071670 A 5/2024

OTHER PUBLICATIONS

Aggarwal et al., "Nail Image Analysis through Unification of Tradition Ayurvedic Wisdom with Deep Learning and Segmentation Techniques", IEEE 2024 1st International Conference on Advanced Computing, Communication and Networking (ICAC2N), pp. 1139-1143. (Year: 2024).*

(Continued)

*Primary Examiner* — Ping Y Hsieh
*Assistant Examiner* — Jose M Torres
(74) *Attorney, Agent, or Firm* — Perspectives Law Group, Corp.

(57) ABSTRACT

A method of operation of a compute system includes: identifying a nail in a usable image; separating an individual nail image from the usable image by segmenting the usable image; evaluating an individual nail score by identifying severity of nail ailments in an entirety of the individual nail image; and generating an artificial intelligence (AI)-NAPSI score and an AI-NAPSOSI score based the individual nail score for displaying on a device.

20 Claims, 10 Drawing Sheets

(6 of 10 Drawing Sheet(s) Filed in Color)

(56) References Cited

U.S. PATENT DOCUMENTS

| | | | |
|---|---|---|---|
| 2019/0289834 A1 | 9/2019 | Marinkovich et al. | |
| 2020/0135310 A1* | 4/2020 | Gedamu | G16H 50/20 |
| 2020/0311939 A1* | 10/2020 | Sota | A61B 5/441 |
| 2021/0120935 A1* | 4/2021 | Shashou | B25J 9/026 |
| 2021/0121572 A1 | 4/2021 | Winckle et al. | |
| 2021/0158559 A1* | 5/2021 | Yamada | G06T 7/64 |
| 2022/0287626 A1* | 9/2022 | Reed | A61B 5/1072 |

OTHER PUBLICATIONS

Janani et al., "Investigation on Nail Denting or Crumbling from Nail Psoriasis Patient Ailment Data using the Machine Learning Algorithm and Data Mining Techniques", IEEE Proceedings of the 8th International Conference on Electronics, Communication and Aerospace Technology (ICECA 2024), pp. 1585-1590. (Year: 2024).*

Roy et al., "Empirical Analysis of Nail Diseases through Using Hybrid Algorithms of LSTM and CNN", IEEE 2024 International Conference on Computing, Power, and Communication Technologies (IC2PCT), pp. 54-59. (Year: 2024).*

Folle et al., "Deepnapsi: Deep Learning for Nail Psoriasis Prediction", 2023 IEEE 20th International Symposium on Biomedical Imaging (ISBI), 2023, pp. 1-5. (Year: 2023).*

Gote et al., "Development of a Nail-based Application for the Detection of Disease using Image Processing", IEEE 2024 2nd DMIHER International Conference on Artificial Intelligence in Healthcare, Education and Industry (IDICAIEI), pp. 1-6. (Year: 2024).*

Rich et al., "Nail Psoriasis Severity Index: A useful tool for evaluation of nail psoriasis", Journal of the American Academy of Dermatology, vol. 49, Issue 2, 2003, pp. 206-212. (Year: 2003).*

Shandilya et al., "Autonomous detection of nail disorders using a hybrid capsule CNN: a novel deep learning approach for early diagnosis", Medical Informatics and Decision Making (2024) 24:414, pp. 1-19. (Year: 2024).*

Pathan et al., "Nail Insight: Enhanced Nail Image Analysis for Early Disease Detection", IEEE 2024 5th International Conference for Emerging Technology (INCET), pp. 1-9. (Year: 2024).*

Mio et al., "Establishment of an intelligent analysis system for clinical image features of melanonychia based on deep learning image segmentation", Computerized Medical Imaging and Graphics 123 (2025) 102543, pp. 1-7. (Year: 2025).*

Kemenes et al., "Advancement and independent validation of a deep learning-based tool for automated scoring of nail psoriasis severity using the modified nail psoriasis severity index", Front Med (Lausanne). Apr. 2, 2025; 12:1574413, pp. 1-11. (Year: 2025).*

Horikawa et al., "Reliable and easy-to-use calculating tool for the Nail Psoriasis Severity Index using deep learning", npj Syst Biol Appl 10, 130 (2024), pp. 1-7. (Year: 2024).*

Maniyan et al., "Early Disease Detection Through Nail Image Processing Based on Ensemble of KNN Classifier and Image Features", IOSR Journal of Computer Engineering (IOSR-JCE), vol. 20, Issue 3, Ver. II (May-Jun. 2018), pp. 14-25. (Year: 2018).*

Abdulhadi et al., "Human Nail Diseases Classification based on Transfer Learning", ICIC Express Leters, vol. 15, No. 12, Dec. 2021, pp. 1271-1282. (Year: 2021).*

Marulkar et al., "Nail Disease Prediction using a Deep Learning Integrated Framework", IEEE 2023 3rd International Conference on Intelligent Technologies (CONIT) Jun. 23-25, 2023, pp. 1-6. (Year: 2023).*

Cassell et al., "The Modified Nail Psoriasis Severity Index: Validation of an Instrument to Assess Psoriatic Nail Involvement in Patients with Psoriatic Arthritis", The Journal of Rheumatology Jan. 2007, 34 (1), pp. 123-129. (Year: 2007).*

* cited by examiner

COMPUTE SYSTEM WITH NAIL AILMENT DIAGNOSTIC MECHANISM AND METHOD OF OPERATION THEREOF

TECHNICAL FIELD

An embodiment of the present invention relates generally to a compute system, and more particularly to a system with a nail ailment diagnostic mechanism.

BACKGROUND

Psoriasis is a chronic autoimmune disease characterized by patches of thick, red, scaly skin. While skin involvement is most common, psoriasis can also affect other parts of the body, including the nails. Nail psoriasis is a common manifestation of the disease, affecting up to 80% of individuals with psoriasis. Nail psoriasis can present in various ways, including pitting, thickening, discoloration, and detachment from the nail bed. These changes can significantly impact a patient's quality of life, leading to physical discomfort, cosmetic concerns, and psychological distress. Despite its prevalence, nail psoriasis remains a poorly understood and often undertreated condition. The underlying mechanisms of nail psoriasis are complex and involve a combination of genetic, environmental, and immunological factors. A better understanding of these factors is essential for developing effective treatments and improving the lives of patients with this condition.

Thus, a need still remains for a compute system with a nail ailment diagnostic mechanism to provide guidelines for clinical research in nail ailment has allowed for quantification of disease to standardize the quantification of nail psoriasis and other diseases impacting the nails. In view of the ever-increasing commercial competitive pressures, along with growing healthcare needs, healthcare expectations, and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a compute system including: identifying a nail in a usable image by positioning a bounding box around the nail; separating an individual nail image from the usable image by segmenting the usable image; evaluating an individual nail score by identifying severity of nail ailments in an entirety of the individual nail image; and generating an artificial intelligence (AI)-NAPSI score and an AI-NAPSOSI score based the individual nail score for displaying on a device.

An embodiment of the present invention provides a compute system, including a control circuit, including a processor, configured to: identify a nail in a usable image; separate an individual nail image from the usable image by segmenting the usable image; and evaluate with a nail ailment artificial intelligence (AI), previously trained, to evaluate an individual nail score by identifying severity of nail ailments in an entirety of the individual nail image) and generate an AI-NAPSI score and an AI-NAPSOSI score based the individual nail score for displaying on a device.

An embodiment of the present invention provides a non-transitory computer readable medium including instructions executable by a control circuit for a compute system performing functions including: identifying a nail in a usable image; separating an individual nail image from the usable image by segmenting the usable image; evaluating an individual nail score by identifying severity of nail ailments in an entirety of the individual nail image; and generating an artificial intelligence (AI)-NAPSI score and an AI-NAPSOSI score based the individual nail score for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

Figure 1:
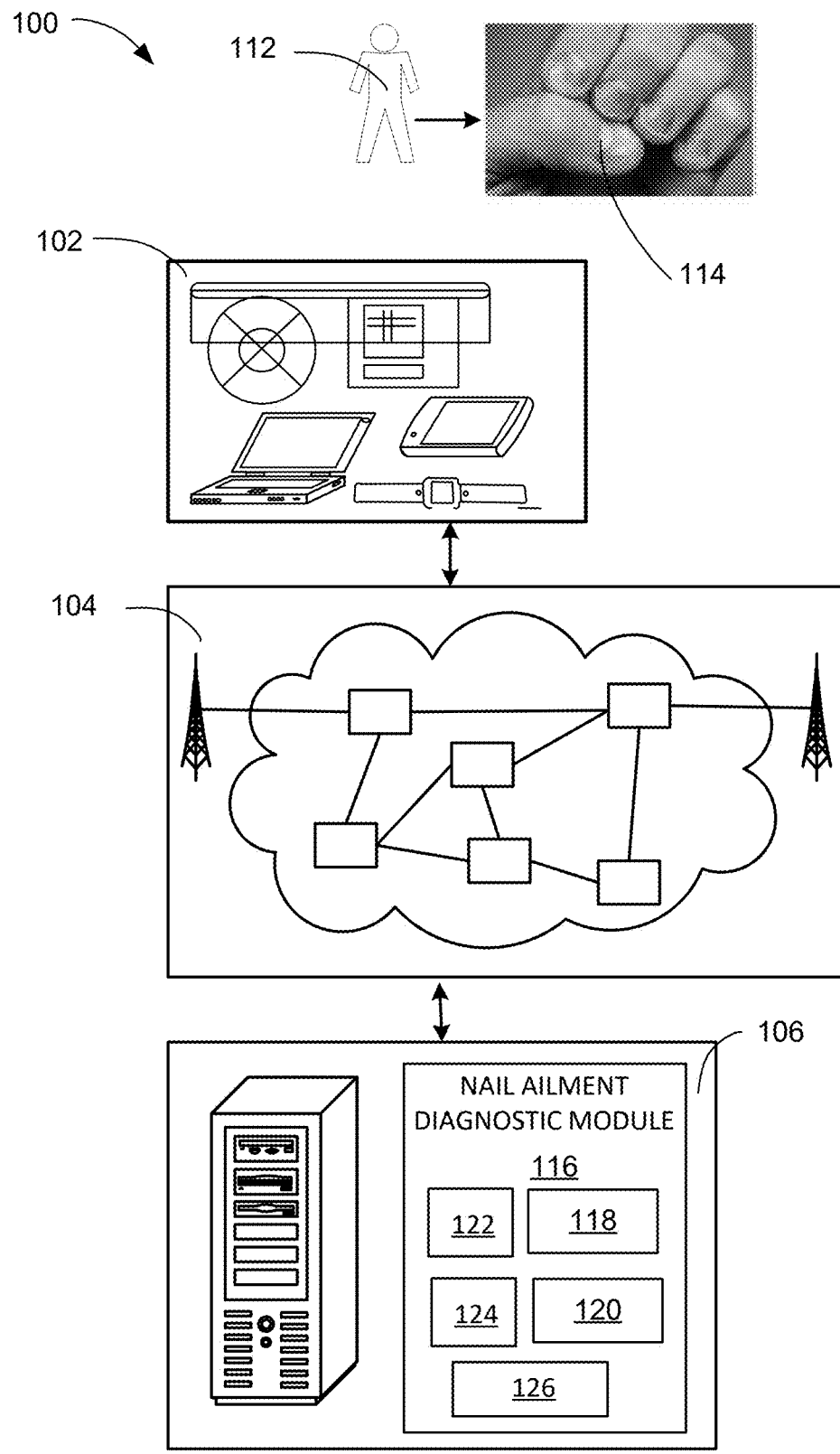
FIG. 1 is an example of a system architectural diagram of a compute system with a nail ailment diagnostic mechanism in an embodiment of the present invention.

A nail ailment artificial intelligence (AI) system allows evaluating an entire nail as a single unit, separately from individual quadrants, providing a more accurate assessment of disease severity and some embodiments of portions of the whole nail not by fixed locations of portions or fixed size of portions, such as quadrants. By scoring the nail as a whole or various portions of the nail of varying sizes or locations of portion(s) of the nail, the potential for inflated scores that may arise when the disease is centrally located can be avoided. Additionally, the nail ailment AI system allows for fractional scores, offering a more precise evaluation of disease progression and enabling tailored treatment plans. This level of granularity ensures that treatment decisions are aligned with the actual severity of the condition.

The present invention provides improvement over, each nail being divided into quadrants and to be scored with one point for the presence of any nail matrix abnormalities (pitting, leukonychia, red spots in lunula, or crumbling), totaling a NAPSIm of 0-4 for each nail. Similarly, each nail quadrant is scored with one point for the presence of any nail bed abnormalities (oil drop discoloration, onycholysis, hyperkeratosis, or splinter hemorrhages), totaling a NAPSIb of 0-4 for each nail. The NAPSIm and NAPSIb scores are then added together to create an overall NAPSI score of 0-8 for each nail, or 0-80 for ten fingers or toes. These limitations make the prior art NAPSI scoring systems insufficient for developing accurate treatment protocols.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

The term "module" or "unit" or "circuit" referred to herein can include or be implemented as or include software running on specialized hardware, hardware, or a combination thereof in the present invention in accordance with the context in which the term is used. For example, the software can be machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "module" or "unit" or a "circuit" is written in the claims section below, the "unit" or the "circuit" is deemed to include hardware circuitry for the purposes and the scope of the claims.

The Nail Psoriasis Severity Index (NAPSI) was developed to provide an objective, numeric, simple, and reproducible measure of Nail Psoriasis (NP) severity identified in patient images. In addition, low to moderate interobserver reliability for the NAPSI has been previously reported. In a prospective study including NP patients comprising 500 fingernails and toenails, interclass correlation coefficients (ICCs) for three dermatologists assessing NAPSI, NAPSIm, and NAPSIb were 0.649, 0.584, and 0.869, respectively.

Convolutional neural networks (CNNs) are a subtype of artificial intelligence (AI) that can be trained with large volumes of data to recognize visual patterns. CNNs have shown promise across dermatology with studies reporting comparable or superior accuracy to dermatologists in diagnosing melanoma, psoriasis, and onychomycosis. These algorithms can optimize manual-intensive and repetitive tasks, ultimately improving reproducibility and usability. Given enough data, CNNs can recognize visual patterns in psoriatic nails, automating NAPSI assessment and improving its reliability.

The module, units, or circuits in the following description of the embodiments can be coupled or attached to one another as described or as shown. The coupling or attachment can be direct or indirect without or with intervening items between coupled or attached modules or units or circuits. The coupling or attachment can be by physical contact or by communication between modules or units or circuits, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown an example of a system architecture diagram of a compute system 100 with a nail ailment diagnostic mechanism in an embodiment of the present invention. Embodiments of the compute system 100 provide standardized and objective Nail Psoriasis Severity Index (NAPSI) scoring to provide for a reproducible precise nail ailment scoring system.

The compute system 100 can include a first device 102, such as a client or a server, connected to a second device 106, such as a client or server. The first device 102 can communicate with the second device 106 through a network 104, such as a wireless or wired network.

For example, the first device 102 can be of any of a variety of computing devices, such as a smart phone, a tablet, a cellular phone, personal digital assistant, a notebook computer, a wearable device, internet of things (IoT) device, or other multi-functional device. Also, for example, the first device 102 can be included in a device or a sub-system.

The first device 102 can couple, either directly or indirectly, to the network 104 to communicate with the second device 106 or can be a stand-alone device. The first device 102 can further be separate form or incorporated with a smart phone, a tablet computer, a laptop computer, a scanner, or other personal electronic devices.

For illustrative purposes, the compute system 100 is described with the first device 102 as a mobile device, although it is understood that the first device 102 can be different types of devices. For example, the first device 102 can also be a non-mobile computing device, such as a server, a server farm, cloud computing, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the compute system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device.

Also, for illustrative purposes, the compute system 100 is described with the second device 106 as a computing device, although it is understood that the second device 106 can be different types of devices. Also, for illustrative purposes, the compute system 100 is shown with the second device 106 and the first device 102 as endpoints of the network 104, although it is understood that the compute system 100 can include a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

For example, the compute system 100 can provide the functions for the patients 112 with the first device 102, the second device 106, distributed between these two devices, or a combination thereof. Also as examples, the compute system 100 can provide a mobile applications for the patients, the clinicians, or a combination thereof. Further as an example, the compute system 100 can provide the functions via a web-browser based applications or a software to be executed on the first device 102, the second device 106, distributed between these two devices, or a combination thereof.

In one embodiment as an example, patient images 114 are taken and uploaded by the patient and reviewed by the clinician. In this embodiment, a patient launches the nail ailment diagnostic mechanism via the mobile application and logs into the patient's account. The patient can be prompted to upload or take images as the patient images 114. The compute system 100 can guide a patient 112 on photo guidelines for the patient images 114 and accepts or rejects the patient images 114 for retake based on a pre-specified criteria, e.g., distance, quality, blur, or a combination thereof. The compute system 100 can also provide guides for a patient on capturing videos as opposed to still photos. The patient images 114 can be selected from the video.

Once the patient images 114, as required for analysis, are successfully uploaded, the compute system 100 can send or load the patient images 114 to a nail ailment diagnostic module 116 for analysis. The nail ailment diagnostic module 116 will be described later. For brevity and clarity and as an example, the nail ailment diagnostic module 116 is shown as being executed in the second device 106 although it is understood that portions can operate on the first device 102, such as the mobile app or the web-browser based application, can operate completely on the first device 102, or a combination thereof. As a further example, the nail ailment diagnostic module 116 can include an image quality checker 118, a nail detector module 120, a nail separation module 122, a nail scoring module 124, and a nail output module 126. The nail ailment diagnostic module 116 can be implemented in software running on specialized hardware, full hardware, or a combination thereof. The nail ailment diagnostic module 116 can be based on a convolutional neural network in a U-Net configuration executing an Inception-ResNet model.

The image quality checker 118 can be implemented in software running on specialized hardware, full hardware, or a combination thereof. The image quality checker 118 analyzes pixels in the patient images 114 to detect the pre-specified criteria, e.g., distance, quality, blur, or a combination thereof. The image quality checker 118 can identify acceptable versions of the patient images 114 with clear visibility of the entire nail plate, uniform focus throughout with no blurring, and without visual obstructions, e.g., nail cosmetics, dirt, or other exogenous pigments.

The nail detector module 120 can be implemented in software running on specialized hardware, full hardware, or a combination thereof. The nail detector module 120 analyzes pixels in the patient images 114 to detect areas in the patient images 114 that include a nail, such as fingers and toes. The nail detector module 120 can identify all of the single nails in the patient images 114.

The nail separation module 122 can be implemented in software running on specialized hardware, full hardware, or a combination thereof. The nail separation module 122 can segment the patient images 114 into individual single nail images, each having a single nail at the center.

The nail scoring module 124 can be implemented in software running on specialized hardware, full hardware, or a combination thereof. The nail scoring module 124 accounts for the identification of nail ailments based on pixel analysis in the patient images 114. The nail scoring module 124 can analyze each of the single nail images to determine the amount and type of the nail ailments detected.

The nail output module 126 can be implemented in software running on specialized hardware, full hardware, or a combination thereof. The nail output module 126 provides an individual nail report that can be utilized by a clinician to plan treatment for nail ailments identified by the nail scoring module 124.

Based on analysis results, the compute system 100 can display information to the patient 112 including a recommendation based on the patient images 114, uploaded, for the patient 112 to schedule a visit with a primary care physician or with a specialist based on the individual nail report.

Continuing the example, the compute system 100 can provide a function that allows the clinician to access the patient images 114 uploaded by the patient 112 and the nail ailment diagnostic module 116, such as with the web-based dashboard. The compute system 100 allows the clinician to make edits to annotations determined by the nail ailment diagnostic module 116 and the scores (if necessary) and saves the results. The clinician can utilize the nail ailment diagnostic module 116 to make the diagnostic decision and suggest necessary treatment steps (if applicable).

The compute system 100 can provide guidance to the clinician on the photo guidelines. The image quality checker 118 can accept or reject images for retake based on a pre-specified criteria, such as distance, quality, blur, luminosity, or a combination thereof. Once the patient images 114 are successfully uploaded, the compute system 100 and send or load the patient images 114 to the nail ailment diagnostic module 116 for analysis.

Continuing the example, the compute system 100 can similarly provide a function that allows the clinician to access the patient images 114 uploaded by the patient 112 and the nail output module 126, such as with the web-based dashboard from the nail ailment diagnostic mechanism 116. The compute system 100 allows the clinician to make edits to annotations determined by the nail ailment diagnostic module 116 and the scores (if necessary) and saves the results. The clinician can utilize the individual nail report from the nail output module 126 to make the diagnostic decision and takes necessary treatment steps (if applicable).

It has been discovered that the compute system 100 can utilize a U-Net convolutional neural network architecture for the nail ailment diagnostic module 116 in order to increase accuracy and reproducibility of the nail output module 126. The compute system 100 can calculate a nail ailment score accurately and repeatably.

Figure 2:
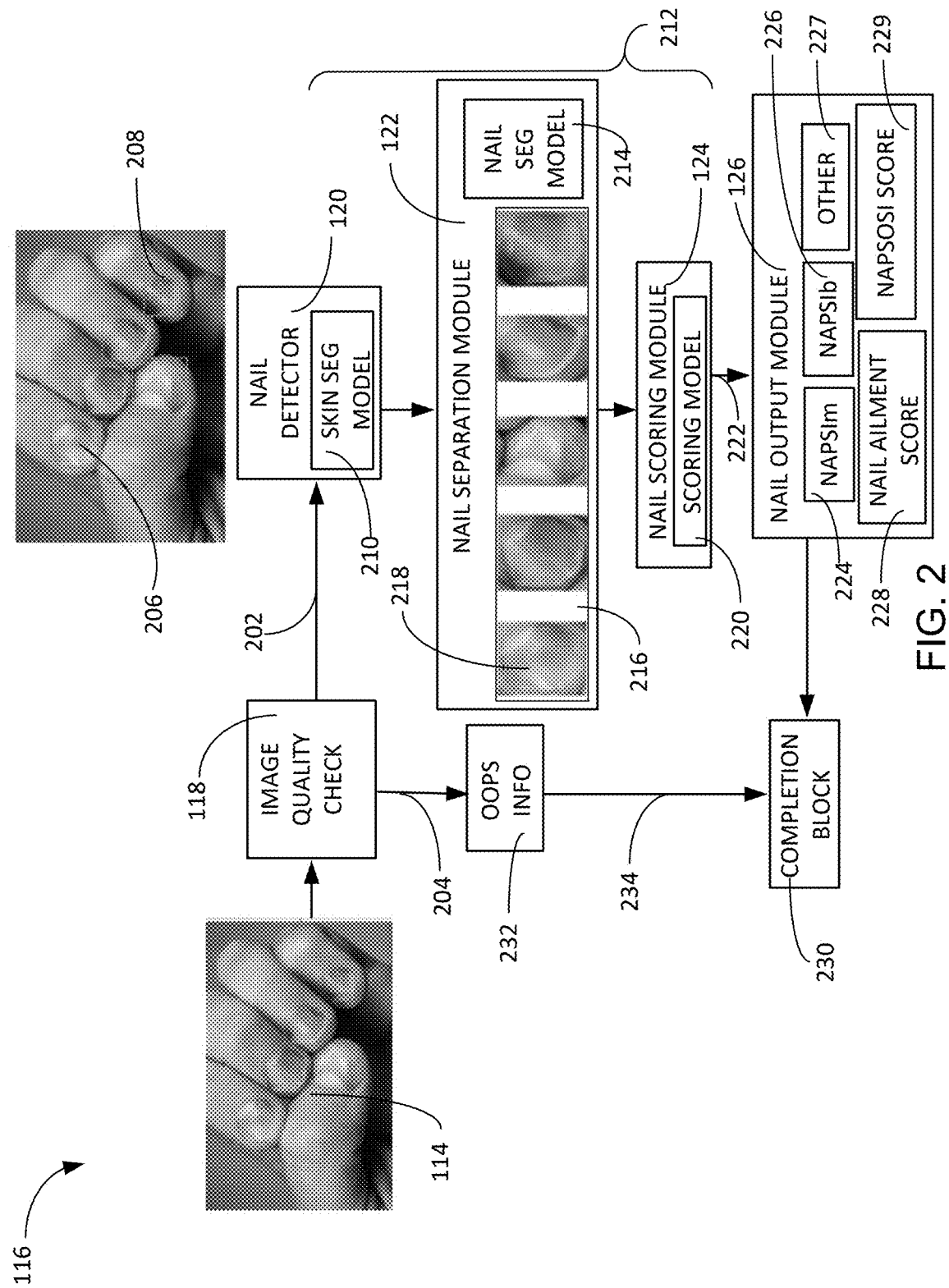
FIG. 2 is an example of a functional block diagram of the nail ailment diagnostic module in an embodiment.

Referring now to FIG. 2, therein is shown a functional block diagram of the nail ailment diagnostic module 116 in an embodiment. The functional block diagram of the nail ailment diagnostic module 116 depicts the patient images 114 processed by the image quality check module 118 to qualify the patient images 114 as a usable image 202 or an irrelevant image 204.

In this example, the image quality check module 118 ensure that the patient images 114 are of good quality and relevant. The image quality check module 118 can verify the pre-specified criteria, e.g., distance, quality, blur, or a combination thereof and the presence of at least a nail 206. The image quality check module 118 can verify clear visibility of the entire nail plate, uniform focus throughout, and without visual obstructions, e.g., nail cosmetics, dirt, or other exogenous pigments as the usable image 202. When the image quality check module 118 determines the patient images 114 is the usable image 202, it passes the usable image 202 to the nail detector module 120.

The nail detector module 120 can be implemented in software running on specialized hardware, full hardware, or a combination thereof. The nail detector module 120 utilizes a skin segmentation model 210 to analyze pixels in the patient images 114 to detect and identify the nail 206 by positioning a bounding box 208 around each of the nail 206 located in the patient images 114. The nail detector module 120 can operate the skin segmentation model 210 as a component of the CNN implementing a first portion of a nail ailment AI 212. The skin segmentation model 210 cab generate a mask to obscure areas of the patient images 114 that are not skin or nail.

The nail detection module 120 can be coupled to the nail separation module 122. The nail separation module 122 can identify the bounding box 208 applied by the skin segmentation model 210. The nail separation module 122 executes a nail segmentation model 214 to produce a set of detected nails 216 including all of an individual nail image 218 identified by the skin segmentation model 210 from the usable image 202. The nail segmentation model 214 is operated on the CNN implementing a second portion of the nail ailment AI 212. The individual nail image 218 can be routinely captured in a doctor's office, under consistent lighting using a digital single-lens reflex camera (DSLR), with the camera positioned perpendicular to the hand or foot of the patient 112. Images with clear visibility of the entire nail plate, uniform focus throughout, and without visual obstructions, e.g., nail cosmetics, dirt, or other exogenous pigments, can be the usable image 202.

The individual nail image 218 can be transferred to the nail scoring module 124 for analysis of any abnormalities shown in the individual nail image 218. The nail scoring module 124 can operate on the CNN implementing a regression (scoring) model 220 as a third portion of a nail ailment AI 212. The scoring model 220 can be trained to detect abnormalities in the individual nail image 218, including crumbling, leukonychia, onycholysis, sublingual hyperkeratosis, pitting, salmon patch, splinter hemorrhage, other signs, or a combination thereof. The scoring model 220 can analyze the pixels of each of the individual nail image 218 to identify abnormalities in the nail matrix or the nail bed.

The scoring model 220 can generate an individual nail score 222 representing the abnormalities in the nail matrix or the nail bed. The scoring model 220 can pass the individual nail score 222 to the nail output module 126 for configuration and assembly of the output. The scoring model 220 generates a NAPSIm 224 representing abnormalities in the nail matrix and a NAPSIb 226 representing abnormalities in the nail base The combination of the NAPSIm 224 and the NAPSIb 226 forms a nail ailment score 228 for each of the individual nail image 218. The nail ailment score 228 can represent the summation of the NAPSIm 224 and the NAPSIb 226 for the entirety of the set of detected nails 216. An AI-NAPSOSI score 229 can be calculated by the summation of the NAPSIm 224, the NAPSIb 226, and the score of other detected nail ailments 227 including paronychia and red lunula.

The nail ailment AI 212 includes the CNN operating the skin segmentation model 210, the nail segmentation model 214, and the scoring model 220. The nail ailment AI 212 improves accuracy and repeatability to diagnosis of the nail ailment score 228 and provides the AI-NAPSOSI score 229. The output module 124 can be coupled to a completion block 230, in which the results are communicated to the patient 112 of FIG. 1 through the first device 102 of FIG. 1.

If the image quality check module 118 determines the patient images 114 as the irrelevant image 204, an oops information module 232 can identify a degree of irrelevance based on the lack of presence of the set of detected nails 216, based on the pre-specified criteria, e.g., distance, quality, blur, or a combination thereof. The oops information module 232 can compile a rejection message 234 indicating the patient image 114 must be retaken for distance, clarity or blur. The rejection message 234 can be transferred to the completion block 230, in which the results are communicated to the patient 112 of FIG. 1 through the first device 102 of FIG. 1.

It has been discovered that the nail ailment diagnostic module 116 can analyze the patient images 114 through the nail ailment AI 212 to generate the nail ailment score 228. The nail ailment diagnostic module 116 can analyze set of detected nails 216, of either finger nails or toe nails, to present the NAPSIm 224, the NAPSIb 226, and other detected nail ailments 227 for each of the individual nail image 218 present in the patient image 114. The nail ailment AI 212 can provide the nail ailment score 228 and the NAPSOSI score 229 that are accurate and repeatable with an excellent correlation (ICC 0.81) between the average NAPSI scores determined by dermatologist nail experts and the nail ailment score 228 generated by the nail ailment AI 212.

Figure 3:
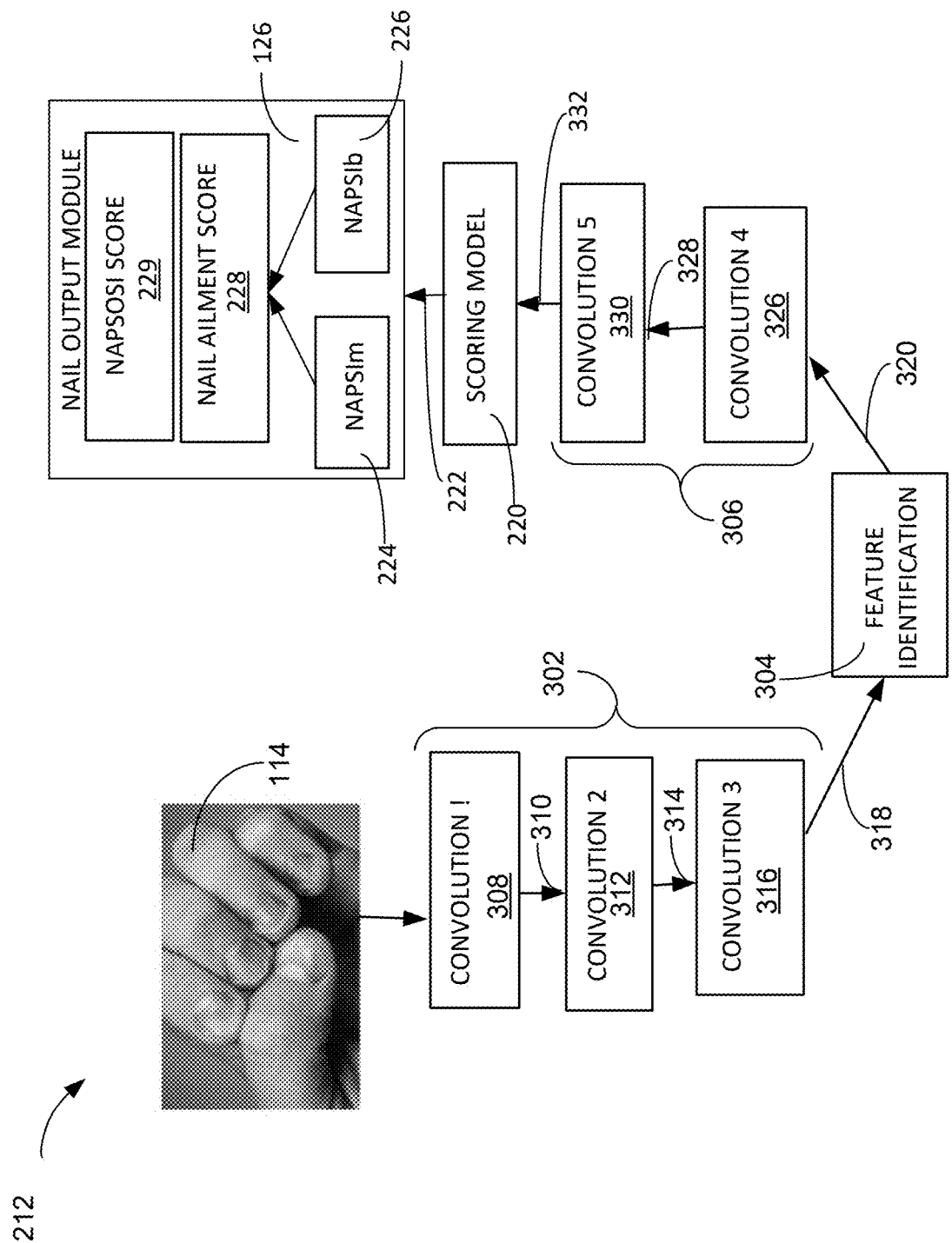
FIG. 3 is an example of a detailed functional block diagram of the naik ailment AI in an embodiment.

Referring now to FIG. 3, therein is shown a functional block diagram of the nail ailment AI 212 in an embodiment. As a specific example, FIG. 3 can depict a U-net implementation of the nail ailment AI 212. The nail ailment AI 212 computes the nail ailment score 228 of FIG. 2 and the NAPSOSI score 229 of FIG. 2, from the NAPSIm 224 of FIG. 2, the NAPSIb 226 of FIG. 2, and the other detected nail ailments 227 of FIG. 2 for each of the individual nail image 218 of FIG. 2 present in the patient images 114 uploaded for the patient 112 of FIG. 1.

The nail ailment AI 212 can process the patient images 114, each of which can include multiple instances of the nail 206 of FIG. 2 in the patient images 114 showing suspected nail ailments of the patient 112 to be analyzed. The compute system 100, the nail ailment AI 212, or a combination thereof can compute the nail ailment score 228 and the NAPSOSI score 229 if the patient images 114 are qualified to be the usable image 202 of FIG. 2 for the patient 112.

In this example for an embodiment, the nail ailment AI 212 can preprocess the patient images 114 to determine if each of the patient images 114 should proceed to be utilized to compute the nail ailment score 228 and the NAPSOSI score 229. The nail ailment AI 212 can include an encoder block 302, a feature identification block 304, and a multi-task decoder block 306. The patient images 114 can be submitted to the encoder block 302 for pixel analysis. The encoder block 302 can include a first convolution module 308 to generate an initial segmentation 310 of the pixels in the patient images 114.

The output of the first convolution module 308 can be coupled to a second convolution module 312, which applies weighted filters to the initial segmentation 310 in order to produce a further segmentation 314. The further segmentation 314 reduces the special dimensions to differentiate the pixels for processing by a third convolution module 316. The third convolution module 316 can apply a finer set of the weighted filter to enhance a pixel stream 318 for analysis by the feature identification block 304.

The feature identification block 304 has been trained to concurrently identify the NAPSIm 224, the NAPSIb 226, and the other detected nail ailments 227, characterized by pitting, crumbling, onycholysis, Leukonychia, salmon patch, splinter hemorrhage, sublingual hyperkeratosis, and other signs including paronychia and red lunula. The analysis by the feature identification block 304 is performed on a pixel-by-pixel basis. The feature identification block 304 can identify a nail ailment factor 320 that can differentiate the NAPSIm 224, the NAPSIb 226, and the other detected nail ailments 227.

The NAPSIm 224, the NAPSIb 226, and the other detected nail ailments 227 can be processed through the multi-task decoder block 306 to concurrently develop a scalp segmentation 204 and a hair loss heat map 206. The feature identification block 304 can be coupled to a fourth convolution module 326 in order to reconstruct the segmented information of the nail ailment factor 320 by applying weighted filters to create larger segments of a converged data stream 328. The converged data stream 328 provides larger segments of the pixel stream 318 with features identified for both the skin segmentation model 210 and the nail segmentation model 214. The concurrent identification and analysis of the skin segmentation model 210 and the nail segmentation model 214 can increase the confidence level and accuracy of the analysis, while reducing the time required to develop the nail ailment score 228 and the NAPSOSI score 229.

The converged data stream 328 can be further processed and converged by a fifth convolutional module 330. The fifth convolutional module 330 concurrently deliver the NAPSIm 224, the NAPSIb 226, and the other detected nail ailments 227 in the processing of the multi-task decoder block 306. A nail analysis stream 332 can be processed by the scoring model 220.

The scoring model 220 can provide the individual nail score 222 to calculate the nail ailment score 228. The nail ailment AI 212 processes multi-task functions in order to produce the NAPSIm 224, the NAPSIb 226, and the other detected nail ailments 227, the nail ailment score 228, and the NAPSOSI score 229 for presentation to a clinician or the patient 112.

It has been discovered that the nail ailment AI 212 can process the patient images 114 in the multi-tasking flow of the nail ailment AI 212. The nail ailment diagnostic module 116 of FIG. 1 can identify the condition captured in the patient images 114 to determine the amount, severity, and type of the nail ailments, including pitting, crumbling, onycholysis, Leukonychia, salmon patch, splinter hemorrhage, sublingual hyperkeratosis, and other signs. The nail ailment score 228 can indicate the seriousness and percentage of nail ailments. The NAPSOSI score 229 can be a refinement of the analysis of the nail ailments.

Figure 4:
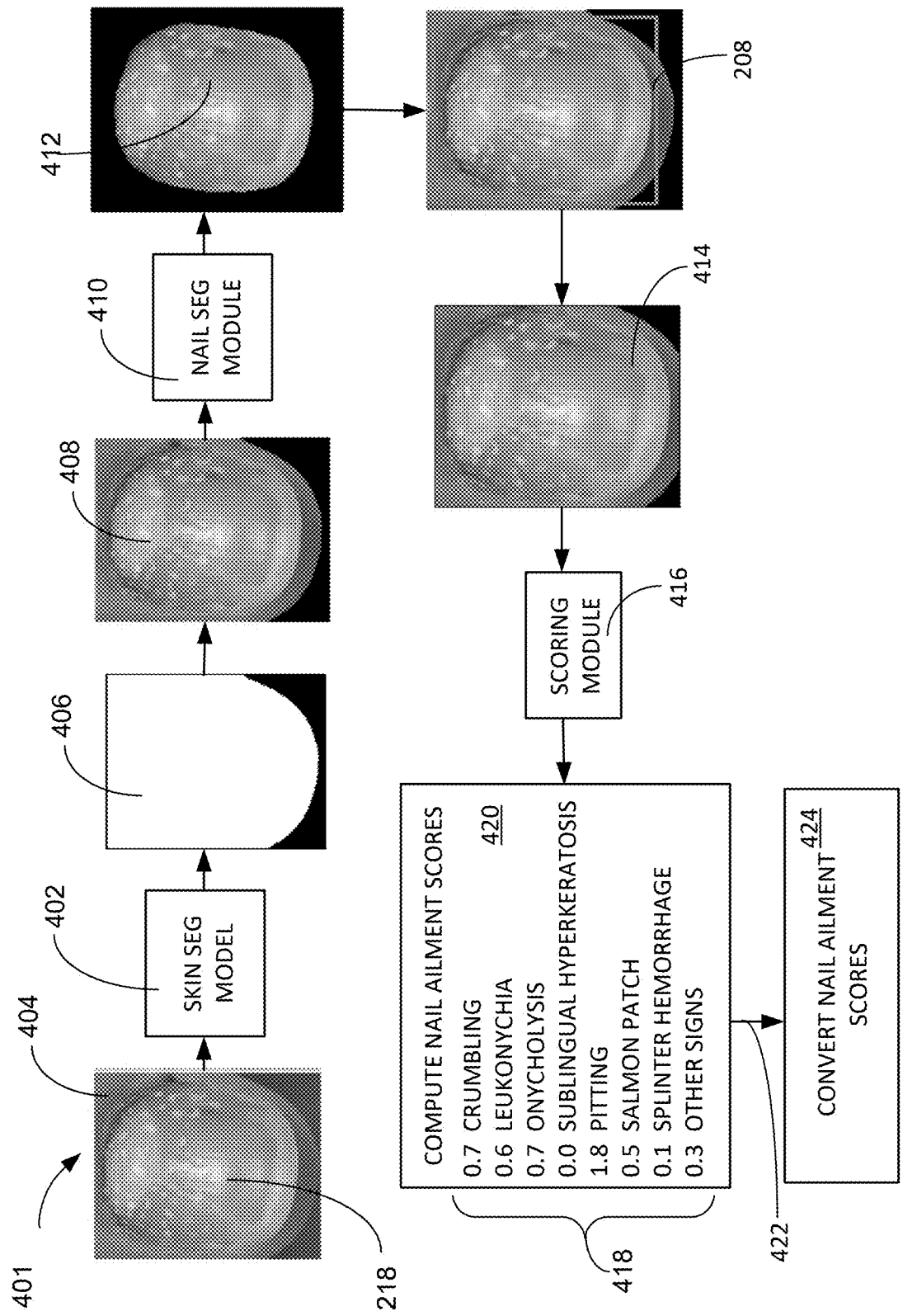
FIG. 4 is an example of a functional block diagram of a nail ailment AI in an embodiment.

Referring now to FIG. 4, therein is shown an example of a functional block diagram of a nail ailment AI 401 in an embodiment. As a specific example, FIG. 3 can depict a U-net implementation of the nail ailment AI 401. The nail ailment AI 401 computes the nail ailment score 228 of FIG. 2 and the NAPSOSI score 229 of FIG. 2, by processing the individual nail image 218 uploaded for the patient 112 of FIG. 1.

The individual nail image 218, with uniform focus across the individual nail image 218, can be submitted to the nail ailment AI 401 for analysis. A skin segmentation module 402 can be implemented in software running on specialized hardware, full hardware, or a combination thereof. The skin segmentation module 402 can segment the individual nail image 218 by a pixel-by-pixel analysis of the individual nail image 218 to identify any area that does not contain skin 404. The skin segmentation module 402 can generate a skin only mask 406 that is applied to the individual nail image 218 to form a whole nail image 408. It is understood that the whole nail image 408 can be a finger nail or a toe nail examined by the skin segmentation module 402.

The whole nail image 408 can be submitted to a nail segmentation module 410 for further processing. The nail segmentation module 410 can be implemented in software running on specialized hardware, full hardware, or a combination thereof. The nail segmentation module 410 can segment the whole nail image 408 by a pixel-by-pixel analysis to strip away all of the skin 404 leaving a nail plate 412 clearly visible without foreign material obstructing the surface. The nail segmentation module 410 then generates the bounding box 208 with a size 10% greater than the nail plate 412 applied to the whole nail image 408. A nail analysis image 414 can be generated by expanding the region within the bounding box 208.

A scoring module 416 can perform a pixel-by-pixel analysis the entirety of the nail analysis image 414 to evaluate nail ailments 418 including pitting, crumbling, onycholysis, Leukonychia, salmon patch, splinter hemorrhage, sublingual hyperkeratosis, and other signs, such as paronychia and red lunula. The scoring module 416 can access a nail ailment compute module 420 in order to assign severity values for each of the nail ailments 418 identified in the nail analysis image 414.

The nail ailment compute module 420 can be implemented in software running on specialized hardware, full hardware, or a combination thereof. The nail ailment compute module 420 can assign an identified score 422 value from zero to three, including fractional scores, for each of the nail ailments 418 identified by the scoring module 416. The identified score 422 with a value of zero indicated no identified areas of the nail ailments 418. The identified score 422 with the value of three indicates a most severe indication of the nail ailment 418 identified by the scoring module 416.

The identified score 422 can be processed by a convert nail ailment scores module 424. The convert nail ailment scores module 424 can be implemented in software running on specialized hardware, full hardware, or a combination thereof. The convert nail ailment scores module 424 can calculate the NAPSIm 224, the NAPSIb 226, and the other detected nail ailments 227, the nail ailment score 228, and the NAPSOSI score 229. The convert nail ailment scores module 424 can calculate the NAPSIm 224 by the following:

$$S\_matrix = 4[(1-x^{4/3})] \text{ where } x = \Pi_i(1-S_i/3) \tag{1}$$

Where $S_i$ is the identified score 422 for x=pitting, crumbling, and Leukonychia The convert nail ailment scores module 424 can calculate the NAPSIb 226 by the following:

$$S\_bed = 4(1-x) \text{ where } x = \Pi_a(1-S_a/3) \tag{2}$$

Where $S_a$ is the identified score 422 for x=onycholysis, salmon patch, splinter hemorrhage, and sublingual hyperkeratosis The convert nail ailment scores module 424 can calculate the nail ailment score 228 by the following:

$$\text{nail ailment score} = S\_matrix + S\_bed \tag{3}$$

The convert nail ailment scores module 424 can also calculate the NAPSOSI score 229 by the following:

$$NAPSOSI = \min(10, SS\_matrix + SS\_bed + SS\_other) \leq 10$$

Where the SS_matrix can be defined by:

$$SS\_matrix = \min(5, pitting + leukonychia + crumbling)$$

The range of the SS_matrix is between zero and five.
Where the SS_bed can be defined by:

$$SS\_bed = \min(5, onycholysis + splinter + salmon + hyperkeratosis)$$

The range of the SS_bed is between zero and five.
Where the SS_other indicated the score of the other detected nail ailments 227 including paronychia and red lunula.

$$SS\_other = \min(5, paronychia + red\ lunula)$$

The range of the SS_other is between zero and five.
The NAPSOSI severity level:

$$0 < absent < 2 < mild < 4 < moderate < 6 < severe$$

It has been discovered that the nail ailment AI 401 can provide the nail ailment score 228 and the NAPSOSI score 229 with finer granularity than previously possible. The inclusion of the other detected nail ailments 227 such as paronychia and red lunula provides an additional measure and clarification of the nail ailments 418 that was previously not available.

Figure 5:
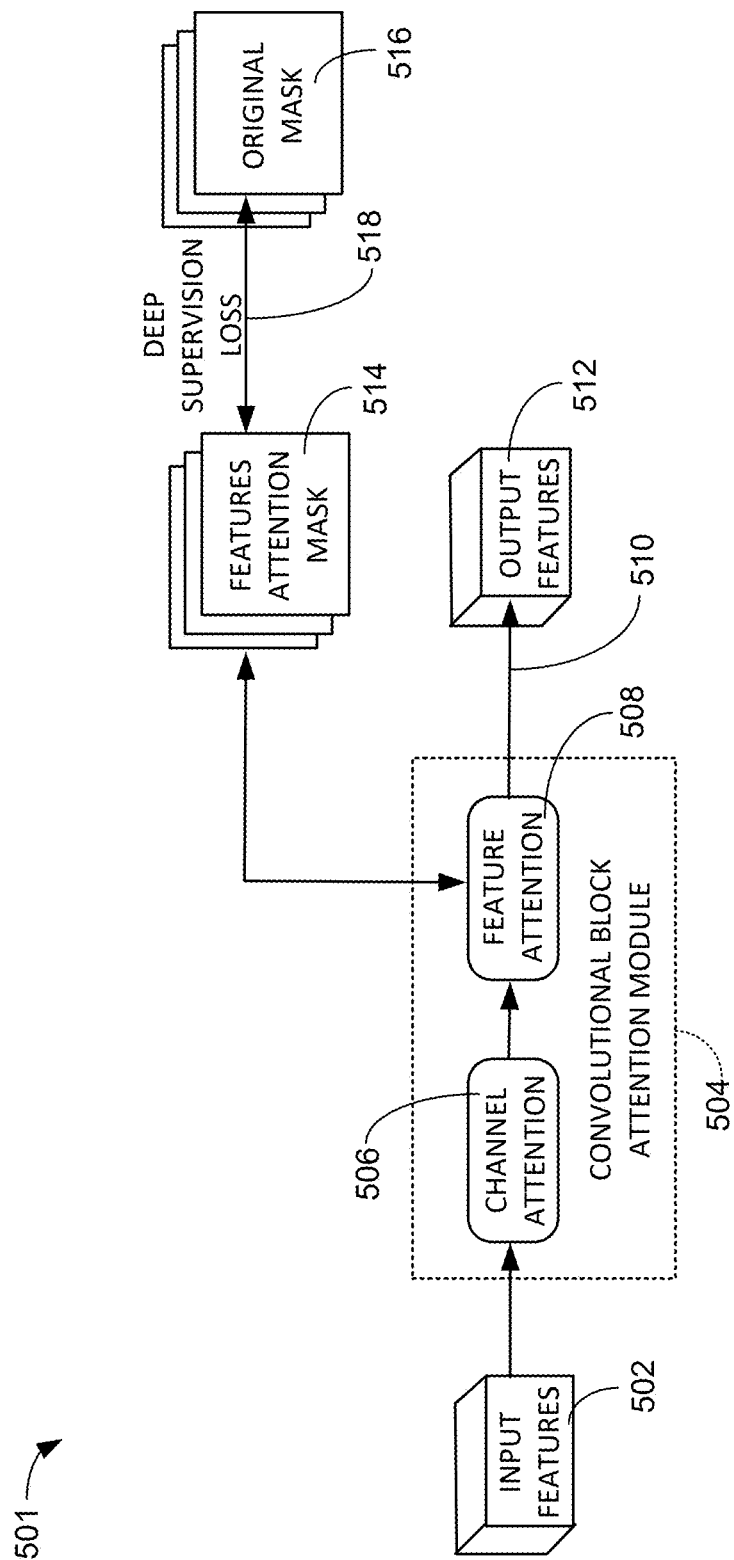
FIG. 5 is a functional block diagram of a Convolutional Block Attention Module (CBAM) for the nail ailment AI in an embodiment.

Referring now to FIG. 5, therein is shown a functional block diagram of a feature enhancement block 501 for the nail ailment AI 212 of FIG. 2 in an embodiment. The feature enhancement block 501 can provide additional focus on the nails detected by the nail ailment AI 212. The feature enhancement block 501 can be a component of the feature identification block 304 of FIG. 3. The feature enhancement block 501 can enhance the detection and resolution of the nail plate 412 of FIG. 4.

An input features module 502 can be implemented in software running on specialized hardware, full hardware, or a combination thereof. The input features module 502 is configured to receive multiple channels developed by the encoder block 302 of FIG. 3. The input features module 502 is the initial stage of the feature detection block 304 of FIG. 3. The input features module 502 can be coupled to a convolutional block attention module (CBAM) 504 that can limit the attention of analysis to the desired features of the patient image 114 of FIG. 1.

The CBAM 504 can be implemented in software running on specialized hardware, full hardware, or a combination thereof. The CBAM 504 can include two major blocks, a channel attention block 506 and a feature attention block 508. The CBAM 504 can focus on important features and suppress unnecessary features in the channel stream generated from the patient image 114.

The channel attention block 506 can process all the channels of the pixel stream 318 of FIG. 3 to determine and identify desired features, such as the nail plate 412. The feature attention block 508 can process the output of the channel attention block 506 in order to identify where the desired feature is located in a segmented image of the pixel stream 318. This includes being able to identify the nail plate 412 from the patient image 114. The output of the feature attention block 508 can be a refined feature stream 510 that can be captured by an output features module 512. The refined feature stream 510 can contain more detail of the desired features, while suppressing the surrounding features that would normally create noise and detract from feature definition.

The output features module 512 can be implemented in software running on specialized hardware, full hardware, or a combination thereof. The output features module 512 can maintain the channel separation, while enhancing the greater detail of the desired features in the refined feature stream 510. The output features module 512 can present the nail ailment factor 320 of FIG. 3 to the multi-task decoder block 306 of FIG. 3 for further processing.

The feature attention block 508 can be adjusted to maintain focus on the desired features by input from a feature attention mask 514. The feature attention mask 514 can be implemented in software running on specialized hardware, full hardware, or a combination thereof. The feature attention mask 514 provides a per-channel adjustment for the desired features, such as the nail plate 412. By reducing any potential noise from surrounding features, the nail ailments 418 of FIG. 4 can be more accurately identified and scored.

In order to maintain the accuracy of the feature attention mask 514, an original mask 516 can be compared to the feature attention mask 514 to calculate a deep supervision loss 518. The original mask 514, such as the skin only mask 406 of FIG. 4 for the entirety of the patient image 114 can be used as a reference for adjustment of the feature attention mask 514.

The deep supervision loss 518 is calculated using a BCE Dice loss to compare the original mask 516 with the feature attention mask 514 to ensure model focus on nails. The deep supervision loss 518 combines Dice loss with the binary cross-entropy (BCE) loss that is generally the default for segmentation models. The deep supervision loss 518 combines the two methods allows for diversity in the loss, while benefitting from the stability of BCE.

It has been discovered that the output features module 512 can present the nail ailment factor 320 to the multi-task decoder block 306 with increased clarity and accuracy. The CBAM 504 can focus on important features and suppress unnecessary features in the channel stream generated from the patient image 114. The features attention mask 514 can provide dynamic adjustments to the feature attention block 508 within the CBAM 504. The dynamic adjustment pf the feature attention block 508 can be provided by the deep supervision loss 518 using the BCE Dice loss to compare the original mask 516 with the feature attention mask 514.

Figure 6:
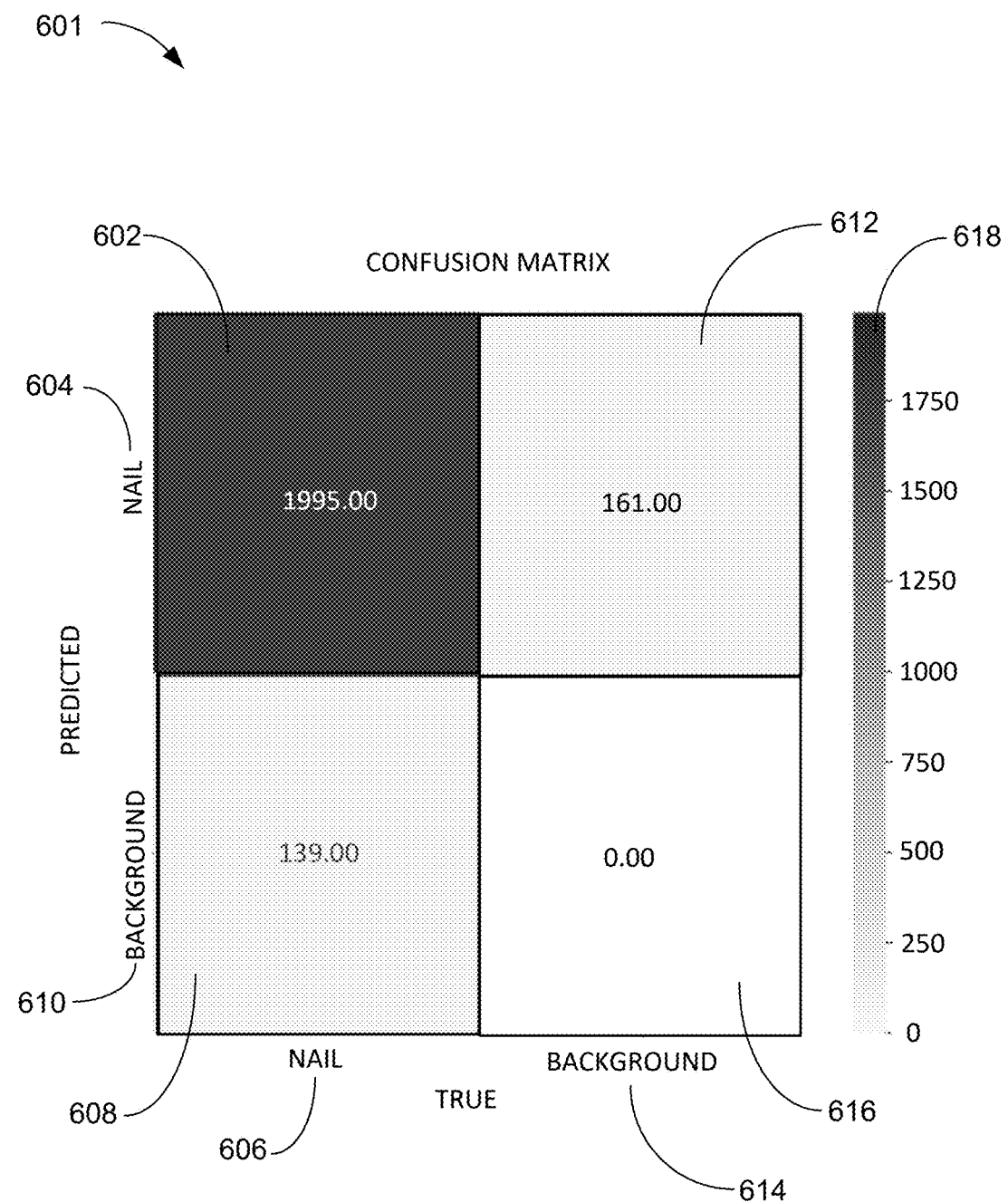
FIG. 6 is a confusion matrix in evaluation of the nail ailment artificial intelligence (AI) in an embodiment.

Referring now to FIG. 6, therein is shown a confusion matrix 601 in evaluation of the nail ailment artificial intelligence (NAI) 212 of FIG. 2 in an embodiment. The confusion matrix 601 of the nail ailment AI 212 provides a visual indication of the quality of detecting and scoring the nail ailments 418 of FIG. 4.

The skin segmentation model 210 of FIG. 2 and the nail segmentation model 214 of FIG. 2 comprise 11.2 million parameters and 28.8 billion FLOPS, providing performance and efficiency for the nail detection and separation tasks. The skin segmentation model 210 and the nail segmentation model 214 were trained with over 400 epochs, yielding impressive results. The validation set, which included 2,131 nail instances, indicated that the model achieved a precision of 92.5% and a recall of 93.5%. Detailed performance metrics can be found in the confusion matrix 601. Additionally, the model attained a mean Average Precision (mAP) of 55.8% at a threshold of 0.95, indicating that over 55% of nails were detected with a confidence level exceeding 95%. These results underscore the model's high accuracy and reliability.

A true nail detection 602 can be positioned in the upper left quadrant of the confusion matrix 601. The true nail detection 602 indicates that a predicted nail 604 is actually a true nail 606 in a validation image set. The true nail detection 602 indicates that 1995.00 instances of the predicted nail 604 is actually the true nail 606.

A false background detection 608 can be positioned in the lower left quadrant of the confusion matrix 601. The false background detection 608 indicates that a predicted background 610 is actually a true nail 606 in a validation image set. The false background detection 608 indicates that 139.00 instances of the predicted background 610 is actually the true nail 606.

A false nail detection 612 can be positioned in the upper right quadrant of the confusion matrix 601. The false nail detection 612 indicates that a predicted nail 604 is actually a true background 614 in a validation image set. The false nail detection 612 indicates that 161.00 instances of the predicted nail 604 is actually the true background 614.

A true background detection 616 can be positioned in the lower right quadrant of the confusion matrix 601. The true background detection 616 indicates that a predicted background 610 is actually the true background 614 in a validation image set. The true background detection 616 indicates that 0.00 instances of the predicted background 610 is actually the true background 614. It is understood that the true background detection 616 shows the instance count of 0.00 because the background is masked out as part of the processing by the nail ailment AI 212 of FIG. 2.

The precision of 92.5% can be calculated by:

$$\text{Precision} = \text{true nail detection}/(\text{true nail detection} + \text{false nail detection}) \tag{4}$$

By way of an example, the confusion matrix 601 indicates Precision=1995/(1995+161) The recall of 93.5% can be calculated by:

$$\text{Recall} = \text{true nail detection}/(\text{true nail detection} + \text{false background detection}) \tag{5}$$

By way of an example, the confusion matrix 601 indicates Recall=1995/(1995+139)

A color scale 618 can indicate the shade of the quadrants in the confusion matrix 601.

Figure 7:
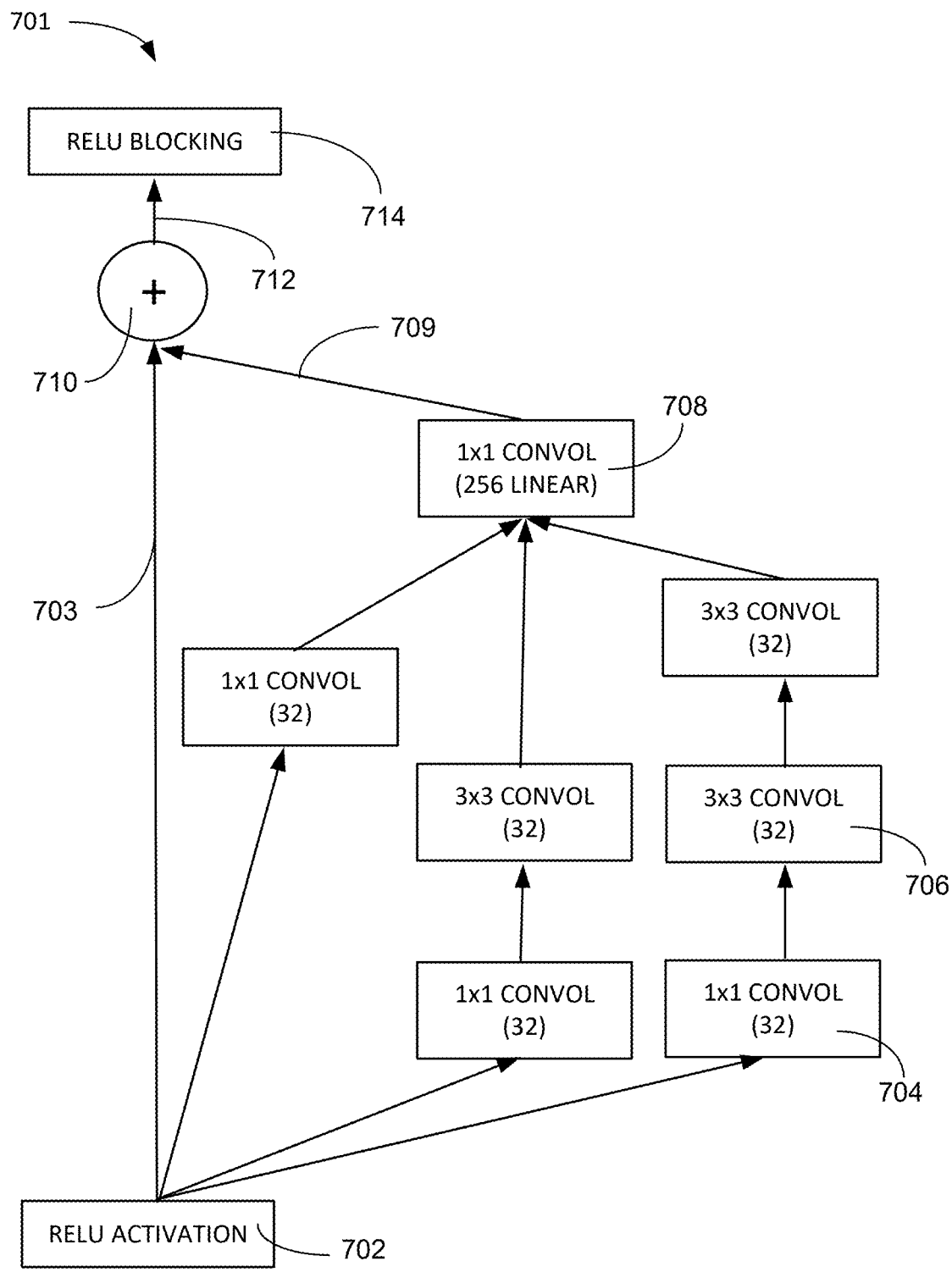
FIG. 7 is an example of an Inception-ResNet model of the nail ailment AI in an embodiment.

Referring now to FIG. 7, there in shown an example of an Inception-ResNet model 701 of the scoring model 220 of FIG. 2 in an embodiment. The compute system 100, the nail ailment diagnostic module 116, or a combination thereof can be implemented in a number of ways for the scoring model 220. For example, the scoring model 220 can be implemented with an Inception-ResNet-v2, which is a convolutional neural network that is trained on more than a million images from the ImageNet database, for the encoding part. The Inception-ResNet-v2 is a convolutional neural architecture that builds on the Inception family of architectures but incorporates residual connections (replacing the filter concatenation stage of the Inception architecture).

The Inception-ResNet model 701 can provide the ability to extract features from input data at varying scales through the utilization of varying convolutional filter sizes together and the Residual technique.

The convolutional neural network used in the scoring model 220 replaces the filter concatenation stage of the Inception architecture with the circuit of FIG. 7 to incorporate residual connections that would otherwise be lost. A rectified linear unit (ReLU) activation module 702 receives the patient image 114 for processing. The ReLU activation module 702 enhances linear relationship between pixels in the patient images 114. A feed forward image 703 is passed a summing junction 710 to be merged with a detailed analysis 709. The image is dispersed to a series of a detail level converter 704, such as a 1×1 converter in a 32 segment array. The detail level converters 704 can be coupled to a broad area converter 706, such as a 3×3 converter in a 32 segment array. The patient image 114 is submitted to three channels for analysis. The first channel consists of only one of the detail level converter 704. The second channel consists of one of the detail level converter 704 coupled to one of the broad area converter 706. The third channel consists of one of the detail level converter 704 coupled to one of the broad area converter 706 coupled to a second one of the broad area converter 706. A detailed area converter 708, such as a 1×1 converter in a 256 bit linear configuration receives input from the first channel, the second channel, and the third channel in order to provide detailed analysis over the entire input of the patient image 114. The summing junction 710 receives the feed forward image 703 of the patient image 114 and the detailed analysis 709 output of the detailed area converter 708 in order to identify skin in the patient image 114.

The summing junction 710 merges enhanced details of the detailed analysis 709 with the feed forward image 703 in order to produce an enhanced image 712 that reflects the patient image 114 with the detailed features enhanced for further analysis. The enhanced image 712 improves the training of the nail ailment artificial intelligence (AI) 212 of FIG. 2. The enhanced image 712 can be processed by a rectified linear unit (ReLU) blocking module 714 that can zero out areas of the patient images 114 that are not enhanced for feature identification.

By way of an example, the Inception-ResNet model 701 can analyze the patient image 114 to locate and enhance the individual nail image 218. The ReLU blocking module 714 can isolate individual nail image 218 from the background of the usable image 202 of FIG. 2 in order to enhance the efficiency and accuracy of the nail ailment AI 212 during the training process.

Figure 8:
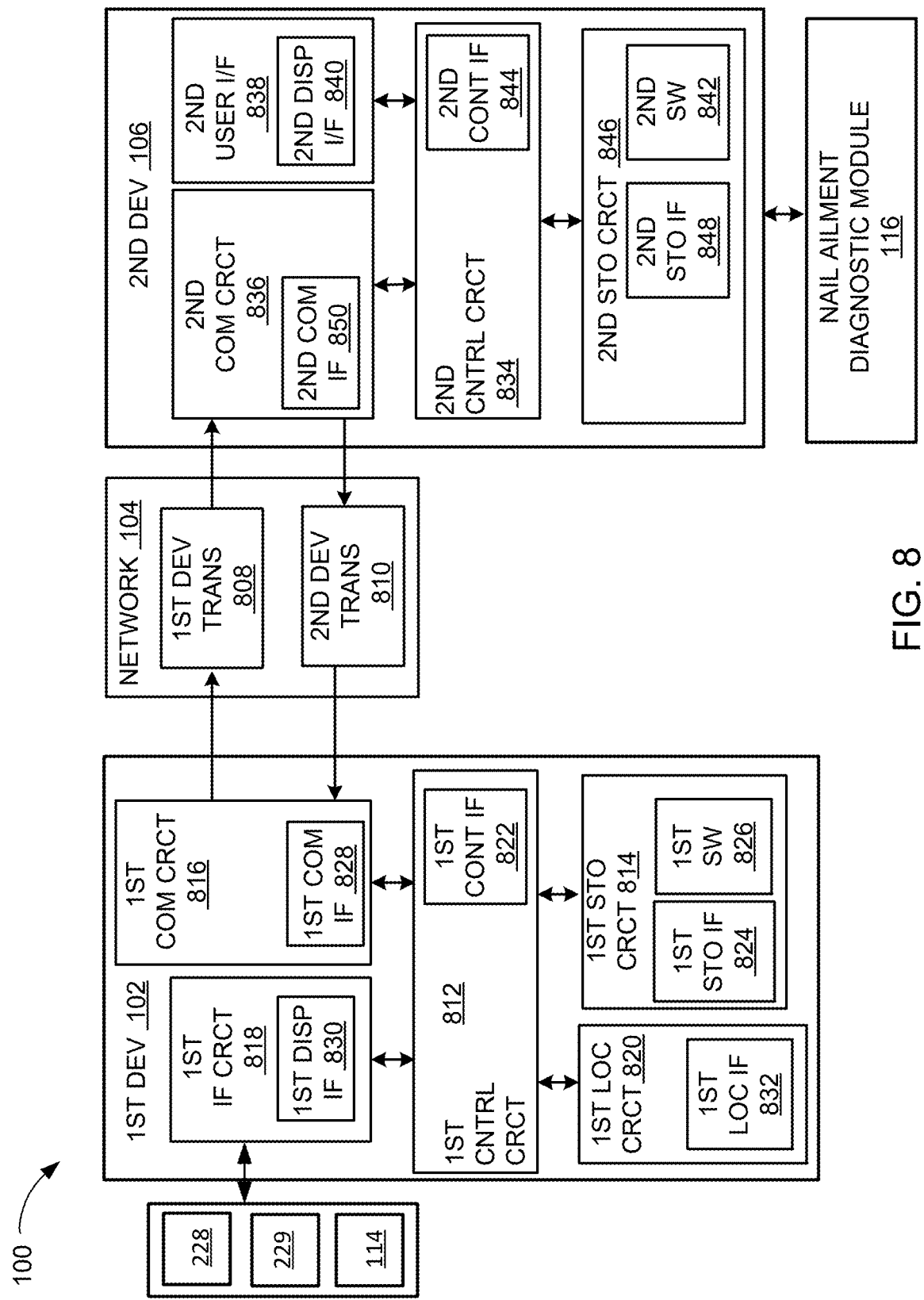
FIG. 8 is an exemplary block diagram of the compute system in an embodiment.

Referring now to FIG. 8, therein is shown an exemplary block diagram of the compute system 100 in an embodiment. The compute system 100 can include the first device 102, the network 104, and the second device 106. The first device 102 can send information in a first device transmission 808 over the network 104 to the second device 106. The second device 106 can send information in a second device transmission 810 over the network 104 to the first device 102.

For illustrative purposes, the compute system 100 is shown with the first device 102 as a client device, although it is understood that the compute system 100 can include the first device 102 as a different type of device.

Also, for illustrative purposes, the compute system 100 is shown with the second device 106 as a server, although it is understood that the compute system 100 can include the second device 106 as a different type of device. For example, the second device 106 can be a client device. By way of an example, the compute system 100 can be implemented entirely on the first device 102 with some functions of the nail ailment diagnostic module 116 executed by a first control circuit 812.

Also, for illustrative purposes, the compute system 100 is shown with interaction between the first device 102 and the second device 106. However, it is understood that the first device 102 can be a part of or the entirety of a tablet computer, a smart phone, or a combination thereof. Similarly, the second device 106 can similarly interact with the first device 102 representing the tablet computer, the smart phone, or a combination thereof.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include the first control circuit 812, a first storage circuit 814, a first communication circuit 816, a first interface circuit 818, and a first location circuit 820. The first control circuit 812 can include a first control interface 822. The first control circuit 812 can execute a first software 826 to provide the intelligence of the compute system 100.

The first control circuit 812 can be implemented in a number of different manners. For example, the first control circuit 812 can be a processor, an application specific integrated circuit (ASIC), an embedded processor, a microprocessor, a hardware control logic, a hardware finite state machine (FSM), a digital signal processor (DSP), or a combination thereof. The first control interface 822 can be used for communication between the first control circuit 812 and other functional units or circuits in the first device 102. The first control interface 822 can also be used for communication that is external to the first device 102. The first control circuit 812 can process the patient images 114 and execute portions of the nail ailment diagnostic module 116.

The first control interface 822 can receive information from the other functional units/circuits or from external sources, or can transmit information to the other functional units/circuits or to external destinations. The external sources and the external destinations refer to sources and destinations external to the first device 102.

The first control interface 822 can be implemented in different ways and can include different implementations depending on which functional units/circuits or external units/circuits are being interfaced with the first control interface 822. For example, the first control interface 822 can be implemented with a pressure sensor, an inertial sensor, a microelectromechanical system (MEMS), optical circuitry, waveguides, wireless circuitry, wireline circuitry, or a combination thereof.

The first storage circuit 814 can store the first software 826. The first storage circuit 814 can also store the relevant information, such as data representing incoming patient images 114, data representing the nail ailment score 228 and the NAPSOSI score 229, or a combination thereof.

The first storage circuit 814 can be a volatile memory, a nonvolatile memory, an internal memory, an external memory, or a combination thereof. For example, the first storage circuit 814 can be a nonvolatile storage such as non-volatile random-access memory (NVRAM), Flash memory, disk storage, or a volatile storage such as static random-access memory (SRAM).

The first storage circuit 814 can include a first storage interface 824. The first storage interface 824 can be used for communication between the first storage circuit 814 and other functional units or circuits in the first device 102. The first storage interface 824 can also be used for communication that is external to the first device 102.

The first storage interface 824 can receive information from the other functional units/circuits or from external sources, or can transmit information to the other functional units/circuits or to external destinations. The external sources and the external destinations refer to sources and destinations external to the first device 102. The first storage interface 824 can receive input from and source data to the nail ailment diagnostic module 116.

The first storage interface 824 can include different implementations depending on which functional units/circuits or external units/circuits are being interfaced with the first storage circuit 814. The first storage interface 824 can be implemented with technologies and techniques similar to the implementation of the first control interface 822.

The first communication circuit 816 can enable external communication to and from the first device 102. For example, the first communication circuit 816 can permit the first device 102 to communicate with the second device 106 and the network 104. The first communication circuit 816 can interact with the second device 106 for implementing the nail ailment diagnostic module 116.

The first communication circuit 816 can also function as a communication hub allowing the first device 102 to function as part of the network 104 and not limited to be an endpoint or terminal circuit to the network 104. The first communication circuit 816 can include active and passive components, such as microelectronics or an antenna, for interaction with the network 104.

The first communication circuit 816 can include a first communication interface 828. The first communication interface 828 can be used for communication between the first communication circuit 816 and other functional units or circuits in the first device 102. The first communication interface 828 can receive information from the second device 106 for distribution to the other functional units/circuits or can transmit information to the other functional units or circuits.

The first communication interface 828 can include different implementations depending on which functional units or circuits are being interfaced with the first communication circuit 88. The first communication interface 828 can be implemented with technologies and techniques similar to the implementation of the first control interface 822.

The first interface circuit 818 allows the patient 112 of FIG. 1 to interface and interact with the first device 102. The first interface circuit 818 can include an input device and an output device. Examples of the input device of the first interface circuit 818 can include a keypad, a touchpad, soft-keys, a keyboard, a microphone, a camera, an infrared sensor for receiving remote signals, or any combination thereof to provide data and communication inputs, such as the patient images 114. The first interface circuit 818 can receive the patient images 114 provided by the patient 112 that can be manipulated by the first control circuit 812.

The first interface circuit 818 can include a first display interface 830. The first display interface 830 can include an output device. The first display interface 830 can include a projector, a video screen, a touch screen, a speaker, a microphone, a keyboard, and combinations thereof. The first display interface 830 can allow the patient to view the nail ailment score 228 and the NAPSOSI score 229 on the output device.

The first control circuit 812 can operate the first interface circuit 818 to display information generated by the compute system 100 and receive input from the patient 112. The first control circuit 812 can also execute the first software 826 for the other functions of the compute system 100, including receiving location information from the first location circuit 820. The first control circuit 812 can further execute the first software 826 for interaction with the network 104 via the first communication circuit 816. The first control circuit 812 can operate portions or all of the nail ailment diagnostic module 116.

The first control circuit 812 can also receive location information from the first location circuit 820. The first control circuit 812 can operate the nail ailment diagnostic module 116 or portions thereof. The first control circuit 812 can operate on the patient images 114, as well as preparing the nail ailment score 228 and the NAPSOSI score 229 for display to the patient 112.

The first location circuit 820 can be implemented in many ways. For example, the first location circuit 820 can function as at least a part of the global positioning system, an inertial compute system, a cellular-tower location system, a gyroscope, or any combination thereof. Also, for example, the first location circuit 820 can utilize components such as an accelerometer, gyroscope, or global positioning system (GPS) receiver.

The first location circuit 820 can include a first location interface 832. The first location interface 832 can be used for communication between the first location circuit 820 and other functional units or circuits in the first device 102.

The first location interface 832 can receive information from the other functional units/circuits or from external sources, or can transmit information to the other functional units/circuits or to external destinations. The external sources and the external destinations refer to sources and destinations external to the first device 102. The first location interface 832 can receive the global positioning location from the global positioning system (not shown).

The first location interface 832 can include different implementations depending on which functional units/circuits or external units/circuits are being interfaced with the first location circuit 820. The first location interface 832 can be implemented with technologies and techniques similar to the implementation of the first control circuit 812.

The second device 106 can be optimized for implementing an embodiment of the present invention in a multiple device embodiment with the first device 102. The second device 106 can provide the additional or higher performance processing power compared to the first device 102. The second device 106 can include a second control circuit 834, a second communication circuit 836, a second user interface 838, and a second storage circuit 846.

The second user interface 838 allows an operator (not shown) to interface and interact with the second device 106. The second user interface 838 can include an input device and an output device. Examples of the input device of the second user interface 838 can include a keypad, a touchpad, soft-keys, a keyboard, a microphone, or any combination thereof to provide data and communication inputs. Examples of the output device of the second user interface 838 can include a second display interface 840. The second display interface 840 can include a display, a projector, a video screen, a speaker, or a combination thereof.

The second control circuit 834 can execute a second software 842 to provide the intelligence of the second device 106 of the compute system 100. The second software 842 can operate in conjunction with the first software 826. The second control circuit 834 can provide additional performance compared to the first control circuit 812. The second control circuit 834 can execute instructions to implement all or some of the functions of the nail ailment diagnostic module 116 including the nail ailment AI 212 of FIG. 2.

The second control circuit 834 can operate the second user interface 838 to display information. The second control circuit 834 can also execute the second software 842 for the other functions of the compute system 100, including operating the second communication circuit 836 to communicate with the first device 102 over the network 104.

The second control circuit 834 can be implemented in a number of different manners. For example, the second control circuit 834 can be a processor, an embedded processor, a microprocessor, hardware control logic, a hardware finite state machine (FSM), a digital signal processor (DSP), or a combination thereof.

The second control circuit 834 can include a second control interface 844. The second control interface 844 can be used for communication between the second control circuit 834 and other functional units or circuits in the second device 106. The second control interface 844 can also be used for communication that is external to the second device 106.

The second control interface 844 can receive information from the other functional units/circuits or from external sources, or can transmit information to the other functional units/circuits or to external destinations. The external sources and the external destinations refer to sources and destinations external to the second device 106.

The second control interface 844 can be implemented in different ways and can include different implementations depending on which functional units/circuits or external units/circuits are being interfaced with the second control interface 844. For example, the second control interface 844 can be implemented with a pressure sensor, an inertial sensor, a microelectromechanical system (MEMS), optical circuitry, waveguides, wireless circuitry, wireline circuitry, or a combination thereof.

The second storage circuit 846 can store the second software 842. The second storage circuit 846 can also store the information such as data representing incoming patient images 114, data representing the individual nail images 218 of FIG. 2, sound files, or a combination thereof. The second storage circuit 846 can be sized to provide the additional storage capacity to supplement the first storage circuit 814.

For illustrative purposes, the second storage circuit 846 is shown as a single element, although it is understood that the second storage circuit 846 can be a distribution of storage elements. Also, for illustrative purposes, the compute system 100 is shown with the second storage circuit 846 as a single hierarchy storage system, although it is understood that the compute system 100 can include the second storage circuit 846 in a different configuration. For example, the second storage circuit 846 can be formed with different storage technologies forming a memory hierarchal system including different levels of caching, main memory, rotating media, or off-line storage.

The second storage circuit 846 can be a controller of a volatile memory, a nonvolatile memory, an internal memory, an external memory, or a combination thereof. For example, the second storage circuit 846 can be a controller of a nonvolatile storage such as non-volatile random-access memory (NVRAM), Flash memory, disk storage, or a volatile storage such as static random access memory (SRAM).

The second storage interface 848 can receive information from the other functional units/circuits or from external sources, or can transmit information to the other functional units/circuits or to external destinations. The external sources and the external destinations refer to sources and destinations external to the second device 106.

The second storage interface 848 can include different implementations depending on which functional units/circuits or external units/circuits are being interfaced with the second storage circuit 846. The second storage interface 848 can be implemented with technologies and techniques similar to the implementation of the second control interface 844.

The second communication circuit 836 can enable external communication to and from the second device 106. For example, the second communication circuit 836 can permit the second device 106 to communicate with the first device 102 over the network 104.

The second communication circuit 836 can also function as a communication hub allowing the second device 106 to function as part of the network 104 and not limited to be an endpoint or terminal unit or circuit to the network 104. The second communication circuit 836 can include active and passive components, such as microelectronics or an antenna, for interaction with the network 104.

The second communication circuit 836 can include a second communication interface 850. The second communication interface 850 can be used for communication between the second communication circuit 836 and other functional units or circuits in the second device 106. The second communication interface 850 can receive information from the other functional units/circuits or can transmit information to the other functional units or circuits.

The second communication interface 850 can include different implementations depending on which functional units or circuits are being interfaced with the second communication circuit 836. The second communication interface 850 can be implemented with technologies and techniques similar to the implementation of the second control interface 844.

The second communication circuit 836 can couple with the network 104 to send information to the first device 102. The first device 102 can receive information in the first communication circuit 816 from the second device transmission 810 of the network 104. The compute system 100 can be executed by the first control circuit 812, the second control circuit 834, or a combination thereof. For illustrative purposes, the second device 106 is shown with the partition containing the second user interface 838, the second storage circuit 846, the second control circuit 834, and the second communication circuit 836, although it is understood that the second device 106 can include a different partition. For example, the second software 842 can be partitioned differently such that some or all of its function can be in the second control circuit 834 and the second communication circuit 836. Also, the second device 106 can include other functional units or circuits not shown in FIG. 8 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium containing instructions for performing the software function of the nail ailment diagnostic module 116, a portion therein, or a combination thereof.

For illustrative purposes, the compute system 100 is described by operation of the first device 102 and the second device 106. It is understood that the first device 102 and the second device 106 can operate any of the modules and functions of the compute system 100 including a distribution of the functions of the nail ailment diagnostic module 116.

Figure 9:
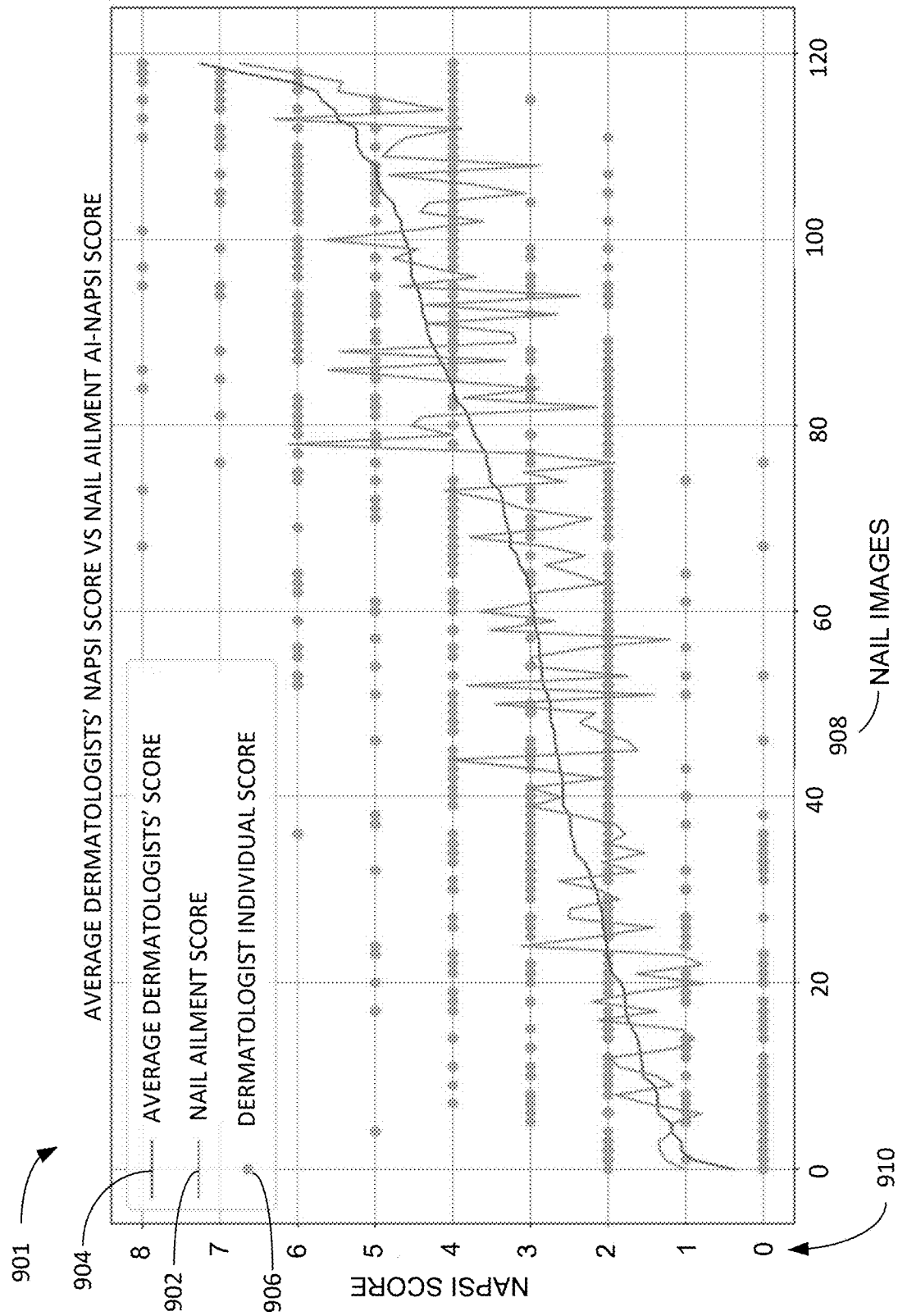
FIG. 9 is an example of a graphical comparison NAPSI scores identified by doctors and the nail ailment AI in an embodiment.

Referring now to FIG. 9, therein is shown an example of a graphical comparison NAPSI scores 901 identified by doctors and the nail ailment AI 212 of FIG. 2 in an embodiment. The graphical comparison NAPSI scores 901 shows a nail ailment score 902, average dermatologist's score 904 and dermatologist individual scores 906.

Nail images 908 are routinely captured in a doctor's office, under consistent lighting using a digital single-lens reflex camera (DSLR) not shown, with the camera positioned perpendicular to the patient's hand/foot. The nail Images 908 with clear visibility of the whole nail image 408 of FIG. 4, uniform focus throughout, and without visual obstructions, e.g., nail cosmetics, dirt, or other exogenous pigments, were included. Image processing included resizing and rotation.

Overall, 619 clinical images were collected, and after considering image quality, and diversity of NP severity and skin type, 240 of the nail images 908 were scored. A mobile application was used to store the nail images 908 along with the corresponding patient ID. The nail ailment AI 212 of FIG. 2 was used to assess disease severity. Seven dermatologists with expertise in the management of nail diseases (B.M.P., C.G., D.R., M.I., M.S., N.C., N.G.C.), selected based on publication history in the field, independently scored batches of the nail images 908 using an interactive web-based application. The individual dermatologists were blinded to others' gradings. The nail mages 908 were grouped into batches of 30 each to facilitate the review process for the dermatologists and ensure that we could maximize the number of the nail images 908 scored.

The same ones of the nail images 908 were also assessed by the nail ailment AI 212, a CNN developed and trained to perform NAPSI classification. The 240 scored images were randomly divided in half. One set of 120 of the nail images 908 was used to calibrate the nail ailment AI 212; the second set of the nail images 908 was used as the validation set for generating the graphical comparison NAPSI scores 901.

The graphical comparison NAPSI scores 901 displays the nail ailment score 902 as an orange line, the dermatologist individual scores 906 as green dots, and the average dermatologist's score 904 as a blue line across 120 images. The graphical comparison NAPSI scores 901 is organized in ascending order based on the average dermatologist's score 904, resulting in a jagged appearance of the nail ailment score 902 due to discrepancies between the nail ailment score 902 and the dermatologist individual scores 906.

The intra-class correlation coefficient (ICC) is a number, usually found to have a value between 0 and 1. It refers to correlations within a class of data (for example correlations within repeated measurements of weight), rather than to correlations between two different classes of data (for example the correlation between weight and length). ICCs were calculated from the 120 images 908 scored by all seven of the dermatologist nail experts. ICCs among all seven dermatologists for overall NAPSI score 910, NAPSIm 224, and NAPSIb 226 scores were 0.43 (95% confidence interval [CI] 0.33-0.55), 0.56 (95% CI 0.46-0.67), and 0.53 (95% CI 0.43-0.65), respectively as shown in Table 1. The highest ICC for the NAPSI score 910 between two reviewers was 0.75 (95% CI 0.61-0.84), followed by 0.64 (95% CI 0.52-0.75) among three reviewers and 0.59 (95% CI 0.47-0.7) among four reviewers. Comparison of the nail ailment score 902, NAPSIm 224, and NAPSIb 226 scores with the average dermatologist's score 904 revealed ICCs of 0.81 (95% CI 0.74-0.86), 0.75 (95% CI 0.65-0.82), and 0.81 (95% CI 0.74-0.86), respectively.

TABLE 1

NAPSI, Nail Psoriasis Severity Index, NAPSIm, nail matrix component, NAPSIb, nail bed component, ICC, interclass correlation coefficient, CI, confidence interval.

| SCORE | ICC among seven dermatologist nail experts (95% CI) | ICC between nail ailment scores and dermatologist generated NAPSI scores (95% CI) |
| --- | --- | --- |
| NAPSI | 0.43 (0.33-0.55) | 0.81 (0.74-0.86) |
| NAPSIm | 0.56 (0.46-0.67) | 0.75 (0.65-0.82) |
| NAPSIb | 0.53 (0.43-0.65) | 0.81 (0.74-0.86) |

It has been discovered that the graphical comparison NAPSI scores 901 demonstrates an excellent correlation between the nail ailment score 902 and the average dermatologist's score 904, highlighting the potential of the nail ailment AI 212 to improve accuracy and reliability in the NAPSI scoring 910.

Figure 10:
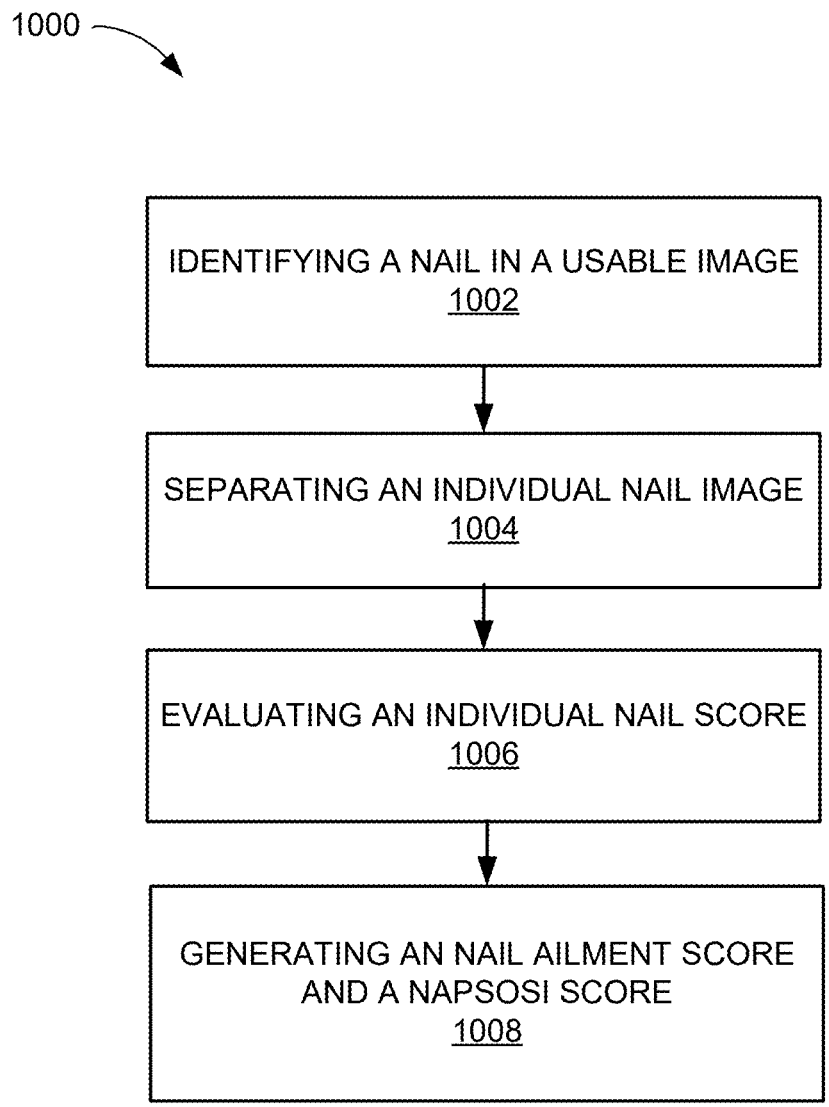
FIG. 10 is a flow chart of a method of operation of a compute system in an embodiment of the present invention.

Referring now to FIG. 10, therein is shown a flow chart of a method 1000 of operation of a compute system 100 of FIG. 1 in an embodiment of the present invention. The method 1000 includes: identifying a nail in the usable image in a block 1002; separating an individual nail image from the usable image by segmenting the usable image in a block 1004; evaluating an individual nail score by identifying severity of nail ailments in an entirety of the individual nail image in a block 1006; and generating a nail ailment score and a NAPSOSI score based the individual nail score for displaying on a device in a block 1008.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a compute system comprising:
   identifying a nail in a usable image;
   separating an individual nail image from the usable image by segmenting the usable image;
   evaluating an individual nail score by identifying severity of a nail ailment of the individual nail image; and
   generating a nail ailment score and a NAPSOSI score based on the individual nail score for displaying on a device.

2. The method as claimed in claim 1 wherein identifying the nail in the usable image includes locating a nail plate clearly visible, with uniform focus, and no visible obstructions.

3. The method as claimed in claim 1 wherein evaluating an individual nail score includes evaluating a pitting, a crumbling, an onycholysis, a Leukonychia, a salmon patch, a splinter hemorrhage, a sublingual hyperkeratosis, a paronychia, a red lunula, or a combination thereof.

4. The method as claimed in claim 1 further comprising calculating a NAPSIm based on a severity score between 0 and 3 for the individual nail image showing a pitting, a crumbling, a Leukonychia, or a combination thereof.

5. The method as claimed in claim 1 further comprising calculating a NAPSIb based on a severity score between 0 and 3 for the individual nail image showing an onycholysis, a salmon patch, a splinter hemorrhage, a sublingual hyperkeratosis, or a combination thereof.

6. The method as claimed in claim 1 wherein generating the nail ailment score includes adding a NAPSIm and a NAPSIb for each of the individual nail image in a set of detected nails identified in the usable image.

7. The method as claimed in claim 1 wherein generating the nail ailment score and the NAPSOSI score includes identifying the nail ailments for each of the individual nail image in a set of detected nails identified in the usable image.

8. A compute system comprising:
a control circuit, including a processor, configured to:
identify a nail in a usable image;
separate an individual nail image from the usable image by segmenting the usable image;
evaluate an individual nail score by identifying severity of nail ailments in an entirety of the individual nail image, and
generate a nail ailment score and a NAPSOSI score based on the individual nail score for displaying on a device.

9. The system as claimed in claim 8 wherein the control circuit configured to identify the nail in the usable image includes locating a nail plate clearly visible, with uniform focus, and no visible obstructions.

10. The system as claimed in claim 8 wherein the control circuit is configured to evaluate an individual nail score includes evaluating pitting, crumbling, onycholysis, Leukonychia, salmon patch, splinter hemorrhage, sublingual hyperkeratosis, paronychia, red lunula, or a combination thereof.

11. The system as claimed in claim 8 wherein the control circuit is further configured to calculate a NAPSIm based on a severity score between 0 and 3 for the individual nail image showing pitting, crumbling, Leukonychia, or a combination thereof.

12. The system as claimed in claim 8 wherein the control circuit is further configured to calculate a NAPSIb based on a severity score between 0 and 3 for the individual nail image showing onycholysis, salmon patch, splinter hemorrhage, sublingual hyperkeratosis evaluating an individual nail score.

13. The system as claimed in claim 8 wherein the control circuit is further configured to generate the nail ailment score includes adding a NAPSIm and a NAPSIb for each of the individual nail image in a set of detected nails identified in the usable image.

14. The system as claimed in claim 8 wherein the control circuit is configured to generate the nail ailment score and the NAPSOSI score includes identifying the nail ailments for each of the individual nail image in a set of detected nails identified in the usable image.

15. A non-transitory computer readable medium including instructions executable by a control circuit for a compute system performing functions comprising:
identifying a nail in a usable image;
separating an individual nail image from the usable image by segmenting the usable image;
evaluating an individual nail score by identifying severity of nail ailments in the individual nail image; and
generating a nail ailment score and a NAPSOSI score based on the individual nail score for displaying on a device.

16. The non-transitory computer readable medium as claimed in claim 15 wherein identifying the nail in the usable image includes locating a nail plate clearly visible, with uniform focus, and no visible obstructions.

17. The non-transitory computer readable medium as claimed in claim 15 wherein identifying severity of nail ailments includes evaluating pitting, crumbling, onycholysis, Leukonychia, salmon patch, splinter hemorrhage, sublingual hyperkeratosis, paronychia, red lunula, or a combination thereof.

18. The non-transitory computer readable medium as claimed in claim 15 further comprising calculating a NAPSIm based on a severity score between 0 and 3 for the individual nail image showing pitting, crumbling, Leukonychia, or a combination thereof.

19. The non-transitory computer readable medium as claimed in claim 15 further comprising calculating a NAPSIb based on a severity score between 0 and 3 for the individual nail image showing onycholysis, salmon patch, splinter hemorrhage, sublingual hyperkeratosis, or a combination thereof.

20. The non-transitory computer readable medium as claimed in claim 15 wherein generating the nail ailment score includes adding a NAPSIm and a NAPSIb for each of the individual nail image in a set of detected nails identified in the usable image.

\* \* \* \* \*